United States Patent
Vankayala et al.

(10) Patent No.: US 12,289,635 B2
(45) Date of Patent: Apr. 29, 2025

(54) METHOD AND SYSTEM FOR MANAGING NETWORK SLICE LOAD IN WIRELESS NETWORK

(71) Applicant: SAMSUNG ELECTRONICS CO., LTD., Suwon-si (KR)

(72) Inventors: Satya Kumar Vankayala, Karnataka (IN); Rajesh Challa, Karnataka (IN); Pankaj Bhimrao Thorat, Karnataka (IN); Seungil Yoon, Suwon-si (KR); Swaraj Kumar, Karnataka (IN); Ashvin K Joseph, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 484 days.

(21) Appl. No.: 17/730,692

(22) Filed: Apr. 27, 2022

(65) Prior Publication Data

US 2022/0353733 A1    Nov. 3, 2022

(30) Foreign Application Priority Data

Apr. 30, 2021 (IN) .............................. 202141019948
Apr. 18, 2022 (IN) .............................. 202141019948

(51) Int. Cl.
*H04W 28/02* (2009.01)
(52) U.S. Cl.
CPC .............................. *H04W 28/0284* (2013.01)
(58) Field of Classification Search
CPC .............................................. H04W 28/0284
USPC ....................................................... 370/229
See application file for complete search history.

(56) References Cited

U.S. PATENT DOCUMENTS

| | | | |
|---|---|---|---|
| 2020/0178158 A1* | 6/2020 | Won | H04W 76/27 |
| 2021/0392553 A1* | 12/2021 | Shi | H04W 36/087 |
| 2022/0015088 A1* | 1/2022 | Pateromichelakis | H04W 72/23 |
| 2022/0338062 A1 | 10/2022 | Bennett et al. | |
| 2023/0328580 A1* | 10/2023 | Pateromichelakis | H04W 28/0268 370/328 |
| 2024/0163741 A1* | 5/2024 | Filin | H04W 36/00833 |

FOREIGN PATENT DOCUMENTS

| | | | |
|---|---|---|---|
| CN | 107820291 | 3/2018 | |
| EP | 3720181 A1 * | 10/2020 | H04W 24/02 |
| GB | 2587256 | 3/2021 | |

OTHER PUBLICATIONS

Indian Office Action issued Nov. 29, 2022 in corresponding Indian Patent Application No. 202141019948.

* cited by examiner

*Primary Examiner* — Faisal Choudhury
(74) *Attorney, Agent, or Firm* — Nixon & Vanderhye P.C.

(57) ABSTRACT

Embodiments herein provide a method for managing a network slice load in a wireless network. The method includes: sending, by a CN device, a request message for network slice load information to a base station of the wireless network; determining, by the base station, the network slice load based on the parameter; sending, by the base station, the response message comprising the network slice load information to the core network device for managing the network slice load; determining, by a CN device, the network slice load at the base station based on the response message; and managing, by a CN device, the network slice load at the base station.

16 Claims, 13 Drawing Sheets

METHOD AND SYSTEM FOR MANAGING NETWORK SLICE LOAD IN WIRELESS NETWORK

CROSS-REFERENCE TO RELATED APPLICATIONS

This application is based on and claims priority under 35 U.S.C. § 119 to Indian Provisional Patent Application No. 202141019948, filed on Apr. 30, 2021, in the Indian Patent Office, and to Indian Non-Provisional Application No. 202141019948, filed on Apr. 18, 2022, in the Indian Patent Office, the disclosures of which are incorporated by reference herein in their entireties.

BACKGROUND

Field

The disclosure relates to an electronic device, and for example, to a method and a system for managing a network slice load in a wireless network.

Description of Related Art

Existing Radio access network Intelligence Controller (RIC) based platform of an Open Radio Access Network (ORAN) requests a gNodeB (gNB) for sharing network slice usage and slice load information aperiodic or periodic with a RIC through E2 nodes. The E2 nodes based on the Performance Management (PM) configuration reports requested PM data to a near-Real Time RIC (near-RT RIC). But a slice management at a core network and an access network (e.g. RAN) operates independently. So that, there is no way for the access network to share the slice load information to the core network. Thus, the core network is unaware of congestion and slice usage at the access network. Existing systems do not disclose a method for sharing congestion and slice usage between the access network and the core network (in ORAN and well as 3GPP). The core network gains full visibility and control over an end-to-end slice management and performance only if the core network receives the slice load information. Thus, it is desired to provide a useful solution for providing slice load information to the core network.

SUMMARY

Embodiments of the disclosure provide a method and a system for managing network slice load in a wireless network.

Embodiments of the disclosure provide a method and system that obtain network slice load information from a RAN by the core network device of the wireless network for load balancing between slice resources, scaling in/out the slice resources, spawning new slices to match QoS requirement, and throttling a slice data traffic of delay tolerance slice services to promote low latency slice services. The core network device gains full visibility and control over an end-to-end slice management and performance in response to obtaining the network slice load information. Moreover, the core network device gains better control on slice resource allocation and traffic to mitigate congestion at an access node (e.g. RAN), which leads to lesser latency, significantly reduce resource usage and improve battery efficiency, performance, and user experience.

Embodiments of the disclosure may determine the network slice load at the RAN using a Machine Learning (ML) model.

Accordingly, example embodiments herein provide a method for managing a network slice load in a wireless network. The method includes: sending, by a core network device of the wireless network, a request message for network slice load information to a base station of the wireless network; receiving, by the core network device, a response message comprising the network slice load information from the base station; determining, by the core network device, the network slice load at the base station based on the response message; and managing, by the core network device, the network slice load at the base station.

In an example embodiment, sending, by the core network device, the request message for the network slice load information to the base station of the wireless network, comprises: sending, by the core network device, the request message to a Non-Real Time Radio-access-network Intelligence Controller (non-RT RIC) through a proprietary interface/message or a new Open Radio Access Network (ORAN) standard E1 Application protocol (E1AP) interface/message, sending, by the non-RT RIC, a slice load monitoring request to a Near Real Time Radio-access-network Intelligence Controller (near-RT RIC), and sending by the near-RT RIC, a Radio-access-network Intelligence Controller (RIC) subscription request to the base station for the network slice load information.

In an example embodiment, receiving, by the core network device, the response message comprising the network slice load information from the base station, comprises: sending, by the base station, the network slice load information to the near-RT RIC, wherein the base station predicts the network slice load by providing a parameter to a Machine Learning (ML) model, sending, by the near-RT RIC, a slice load monitoring indication comprising the network slice load information to the non-RT RIC, sending, by the non-RT RIC, the response message comprising the network slice load information to the core network device through the proprietary interface/message or the new ORAN standard E1AP interface/message by mapping a base station slice with a corresponding core network slice, and receiving, by the core network device, the response message from the non-RT RIC.

In an example embodiment, sending, by the core network device, the request message for the network slice load information to the base station of the wireless network, comprises: sending, by the core network device, the request message to the near-RT RIC through the new ORAN standard E1AP interface/message, sending, by the near-RT RIC, the RIC subscription request to the base station for the network slice load information.

In an example embodiment, receiving, by the core network device, the response message comprising the network slice load information from the base station, comprises: sending, by the base station, the network slice load information to the near-RT RIC, wherein the base station predicts the network slice load by providing the parameter to the ML model, sending, by the near-RT RIC, the response message comprising the network slice load information to the core network device through the new ORAN standard E1AP interface/message, and receiving, by the core network device, the response message from the near-RT RIC.

In an example embodiment, the method further comprises storing, by near-RT RIC, the network slice load information, upon receiving the network slice load information from the base station.

In an example embodiment, the request message comprises the slice load monitoring request, and the response message comprises the slice load monitoring indication or a slice load monitoring response.

In an example embodiment, the core network device and the base station are configured to communicate with each other using a new E2 interface In an example embodiment, managing, by the core network device, the network slice load at the base station, comprises: performing, by the core network device, load balancing between slice resources, scaling in/out the slice resources, spawning new slices to match QoS requirement, and throttling a slice data traffic of delay tolerance slice services to promote low latency slice services.

In an example embodiment, the core network device is configured to receive the response message periodically or on-demand.

Accordingly, the example embodiments herein provide a method for managing the network slice load in the wireless network. The method includes: receiving, by the base station of the wireless network, the request message for the network slice load information from the core network device of the wireless network; determining, by the base station, the network slice load based on the parameter; sending, by the base station, the response message comprising the network slice load information to the core network device for managing the network slice load.

In an example embodiment, determining, by the base station, the network slice load based on the parameter, comprises: receiving, by the Machine Learning (ML) model of the base station, the parameter comprises time, a load of the base station, a base station identifier, User Equipments (UEs) capability details, Quality of Service (QoS) or QoS Class Identifier (QCI) information, channel conditions, a Channel Quality Indicator (CQI) distribution of the UEs, climatic conditions, base station capabilities, day information, base station topology, load information of neighboring base stations, transmit power of the neighboring base stations, capabilities of the neighboring base stations, load information of the neighboring base stations, and predicting, by the ML model, the network slice load based on the parameter.

In an example embodiment, receiving, by the base station, the request message for the network slice load information from the core network device of the wireless network, comprises: sending, by the core network device, the slice load monitoring request to the non-Real Time Radio-access-network Intelligence Controller (non-RT RIC) through the proprietary interface/message or the new Open Radio Access Network (ORAN) standard E1 Application protocol (E1AP) interface/message, sending, by the non-RT RIC, the slice load monitoring request to the near Real Time Radio-access-network Intelligence Controller (near-RT RIC), sending by the near-RT RIC, the request message to the base station for the network slice load information, and receiving, by the base station, the request message for the network slice load information from the near-RT RIC.

In an embodiment, sending, by the base station, the response message comprising the network slice load information to the core network device, comprises: sending, by the base station, the response message comprising the network slice load information to the near-RT RIC, sending, by the near-RT RIC, the slice load monitoring indication comprising the network slice load information to the non-RT RIC, sending, by the non-RT RIC, the slice load monitoring indication comprising the network slice load information to the core network device through the proprietary interface/message or the new ORAN standard E1AP interface/message by mapping the base station slice with the corresponding core network slice.

In an example embodiment, receiving, by the base station, the request message for the network slice load information from the core network device of the wireless network, comprises: sending, by the core network device, the slice load monitoring request to the near-RT RIC through the new ORAN standard E1AP interface/message, sending, by the near-RT RIC, the request message to the base station for the network slice load information, and receiving, by the base station, the request message from the near-RT RIC.

In an example embodiment, sending, by the base station, the response message comprising the network slice load information to the core network device, comprises: sending, by the base station, the response message comprising the network slice load information to the near-RT RIC, sending, by the near-RT RIC, the slice load monitoring indication comprising the network slice load information to the core network device through the new ORAN standard E1AP interface/message, and receiving, by the core network device, the slice load monitoring indication from the near-RT RIC.

In an example embodiment, the method further comprises: storing, by near-RT RIC, the network slice load information, upon receiving the network slice load information from the base station.

In an example embodiment, the request message comprises the slice load monitoring request or the Radio-access-network Intelligence Controller (RIC) subscription request, and the response message comprises a RIC indication or the slice load monitoring response.

In an example embodiment, the core network device and the base station are configured to communicate with each other using the new E2 interface.

In an example embodiment, the base station is configured to send the response message periodically or on-demand.

Accordingly, example embodiments herein provide the core network device for managing the network slice load in the wireless network. The core network device includes: a network slice load controller, a memory, a processor, where the network slice load controller is coupled to the memory and the processor. The network slice load controller is configured to: send the request message for the network slice load information to the base station of the wireless network; receive the response message comprising the network slice load information from the base station; determine the network slice load at the base station based on the response message; and manage the network slice load at the base station.

Accordingly, example embodiments herein provide a base station for managing the network slice load in the wireless network. The base station includes: a network slice load controller, a memory, a processor, where the network slice load controller is coupled to the memory and the processor. The network slice load controller is configured to: receive the request message for the network slice load information from the core network device of the wireless network; determine the network slice load based on the parameter; send the response message comprising the network slice load information to the core network device for managing the network slice load.

These and other aspects of the various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the embodiments, and the embodiments herein include all such modifications.

BRIEF DESCRIPTION OF THE DRAWINGS

This method and apparatus are illustrated in the accompanying drawings, throughout which like reference letters indicate corresponding parts in the various figures. Further, the above and other aspects, features and advantages of certain embodiments of the present disclosure will be more apparent from the following detailed description, taken in conjunction with the accompanying drawings, in which.

DETAILED DESCRIPTION

Figure 1A:
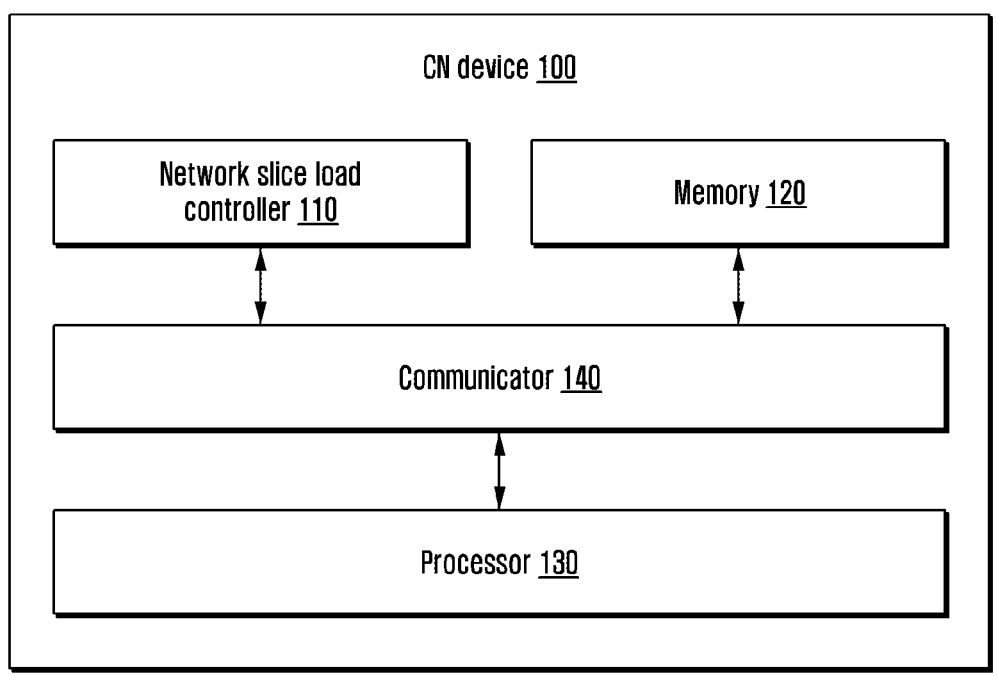
FIG. 1A is a block diagram illustrating an example configuration of a core network device for managing a network slice load in a wireless network, according to various embodiments.

The various example embodiments herein and the various features and advantageous details thereof are explained more fully with reference to the non-limiting embodiments that are illustrated in the accompanying drawings and detailed in the following description. Descriptions of well-known components and processing techniques may be omitted so as to not unnecessarily obscure the embodiments herein. The various example embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to aid in understanding various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Throughout this disclosure, the terms "base station" and "RAN" are used interchangeably and refer to the same or similar configuration. Throughout this disclosure, the terms "CN device" and "CN" are used interchangeably and refer to the same or similar configuration.

Accordingly, various example embodiments herein provide a method for managing a network slice load in a wireless network. The method includes: sending, by a core network device of the wireless network, a request message for network slice load information to a base station of the wireless network; receiving, by the core network device, a response message comprising the network slice load information from the base station; determining, by the core network device, the network slice load at the base station based on the response message; and managing, by the core network device, the network slice load at the base station.

Accordingly, various example embodiments herein provide a method for managing the network slice load in the wireless network. The method includes: receiving, by the base station of the wireless network, the request message for the network slice load information from the core network device of the wireless network; determining, by the base station, the network slice load based on the parameter; and sending, by the base station, the response message comprising the network slice load information to the core network device for managing the network slice load.

Accordingly, various example embodiments herein provide a system comprising: the Core Network (CN) device and the base station configured to manage the network slice load in the wireless network. The core network device includes: a network slice load controller, a memory, a processor, where the network slice load controller is coupled to the memory and the processor. The network slice load controller is configured to: send the request message for the network slice load information to the base station of the wireless network; receive the response message comprising the network slice load information from the base station; determine the network slice load at the base station based on the response message; and manage the network slice load at the base station.

Accordingly, various example embodiments herein provide a system comprising the Core Network (CN) device and the base station configured to manage the network slice load in the wireless network. The base station includes: a network slice load controller, a memory, a processor, where the network slice load controller is coupled to the memory and the processor. The network slice load controller is configured to: receive the request message for the network slice load information from the core network device of the wireless network; determine the network slice load based on the response message; and send the response message comprising the network slice load information to the core network device for managing the network slice load.

The CN device subscribes for the network slice load information to an ORAN near-Real Time RIC through a proprietary interface and message. The near-Real Time RIC requests E2 nodes (e.g. base station) to report the requested Performance Management (PM) using a E2 interface. The base station predicts the expected network slice load using a ML model that runs in a RIC of an ORAN or Centralized Unit (CU) and Distributed Unit (DU) or combination of three and conveys the predicted slice load values to the CN device, may be via non-RT RIC. The base station shares the access node slice load information to the CN device to gain full visibility and control over end-to-end slice and its performance. The near-real time RIC on-demand/periodically reports the network slice load information to the CN device through the proprietary interface and message. Based on the slice load information, the CN device performs slice resource optimization (e.g., scale in/scale out the slice resources), load balancing between slices (e.g., reconfigure bearer to less loaded slice on effected gNodeB), and throughput optimization per slice, spawn new slices to match QoS requirement considering a current load condition, throttle slice data traffic of delay tolerance slice services (e.g. enhanced Mobile Broadband (eMBB)) to promote a low latency slice services (e.g. Ultra-Reliable And Low-Latency Communication (URLLC)).

Unlike existing methods and systems, the method allows the core network device to obtain the network slice load information from the base station for load balancing between slice resources, scaling in/out the slice resources, spawning new slices to match QoS requirement, and throttling a slice data traffic of delay tolerance slice services to promote low latency slice services. The core network device gains full visibility and control over an end-to-end slice management and performance in response to obtaining the network slice load information. Moreover, the core network device gains better control on slice resource allocation and traffic to mitigate congestion at an access node (e.g. RAN), which leads to lesser latency, significantly reduce resource usage and improve battery efficiency, performance, and user experience.

Referring now to the drawings, and more particularly to FIGS. 1A through 12, there are shown various example embodiments.

FIG. 1A is a block diagram illustrating an example configuration of a Core Network (CN) device (100) for managing a network slice load in a wireless network, according to various embodiments. An example of the wireless network is a cellular network. In an embodiment, the CN device (100) includes a network slice load controller (e.g., including processing/controller circuitry) (110), a memory (120), a processor (e.g., including processing circuitry) (130), and a communicator (e.g., including communication circuitry) (140). The network slice load controller (110) may be implemented by processing circuitry such as logic gates, integrated circuits, microprocessors, microcontrollers, memory circuits, passive electronic components, active electronic components, optical components, hard-wired circuits, or the like, and may optionally be driven by a firmware. The circuits may, for example, be embodied in one or more semiconductor chips, or on substrate supports such as printed circuit boards and the like.

The network slice load controller (110) sends a request message for network slice load information (e.g., information of the network slice load) to a base station (400) of the wireless network. The network slice load controller (110) receives a response message comprising the network slice load information from the base station. The network slice load controller (110) determines the network slice load at the base station based on the response message. The network slice load controller (110) manages the network slice load at the base station (400). In an embodiment, the request message is a slice load monitoring request, and the response message is a slice load monitoring indication or a slice load monitoring response. In an embodiment, the network slice load controller (110) and the base station (400) communicates each other using a new E2 interface. In an embodiment the network slice load controller (110) manages the network slice load at the base station (400) by performing load balancing between slice resources or scaling in/out the slice resources, or spawning new slices to match QoS requirement, or throttling a slice data traffic of delay tolerance slice services to promote low latency slice services. In an embodiment the network slice load controller (110) receives the response message periodically or on-demand.

In an embodiment, the network slice load controller (110) sends the request message to a Non-Real Time Radio-access-network Intelligence Controller (non-RT RIC) (200) through the proprietary interface/message or a new Open Radio Access Network (ORAN) standard E1 Application protocol (E1AP) interface/message. The network slice load controller (110) receives the response message from the non-RT RIC (200). In an embodiment, the network slice load controller (110) sends the request message to a near-RT RIC (300) through a new ORAN standard E1AP interface/message. The network slice load controller (110) receives the response message from the near-RT RIC (300).

The memory (120) stores instructions to be executed by the processor (130). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information than its storage space. In certain examples, a non-transitory storage medium may store data that can, over time, change (e.g., in Random Access Memory (RAM) or cache). The memory (120) can be an internal storage unit or it can be an external storage unit of the CN device (100), a cloud storage, or any other type of external storage.

The processor (130) is configured to execute instructions stored in the memory (120). The processor (130) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130) may include multiple cores to execute the instructions. The communicator (140) is configured for communicating internally between hardware components in the CN device (100). Further, the communicator (140) is configured to facilitate the communication between the CN device (100) and other devices via one or more networks (e.g. Radio technology). The communicator (140) includes an electronic circuit specific to a standard that enables wired or wireless communication.

Although FIG. 1 shows the hardware components of the CN device (100) but it is to be understood that various embodiments are not limited thereon. In various embodiments, the CN device (100) may include less or a greater number of components. Further, the labels or names of the components are used only for illustrative purpose and does not limit the scope of the disclosure. One or more components can be combined together to perform same or substantially similar function for managing the network slice load.

Figure 1B:
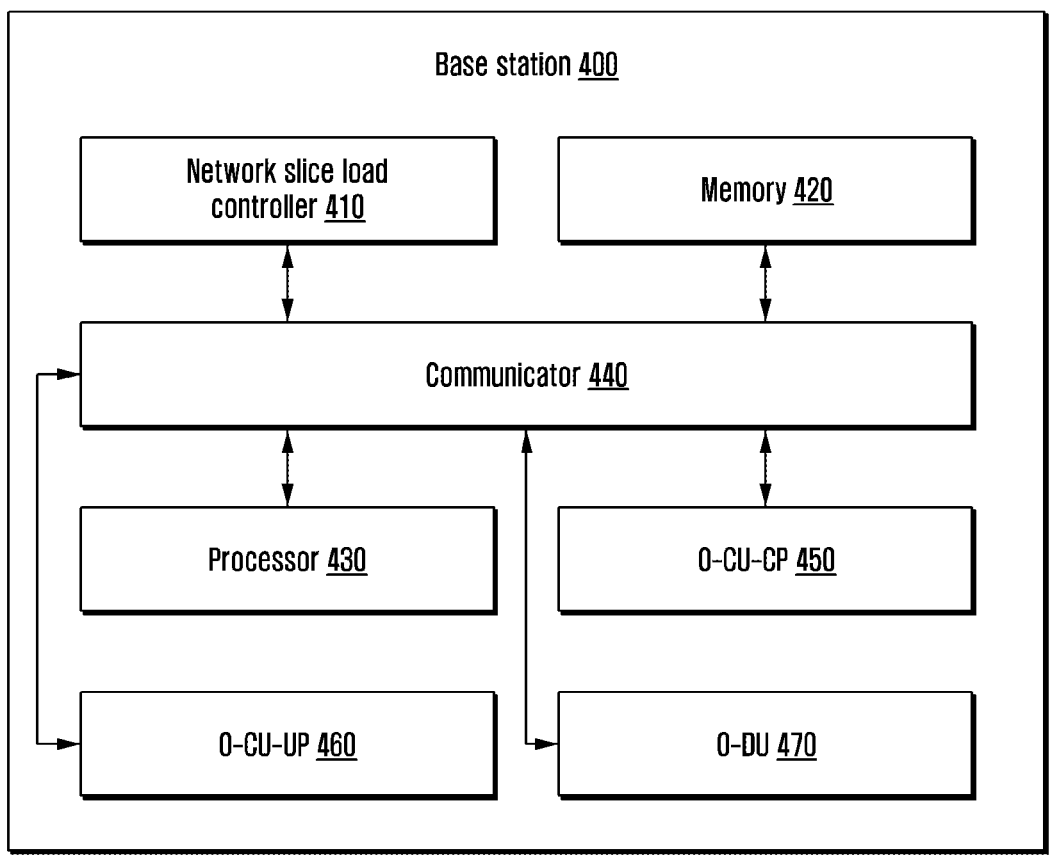
FIG. 1B is a block diagram illustrating an example configuration of a base station for managing the network slice load in the wireless network, according to various embodiments.

FIG. 1B is a block diagram illustrating an example configuration of the base station (400) for managing the network slice load in the wireless network, according to an embodiment as disclosed herein. An example of the base station (400) may include a gNodeB. In an embodiment, the base station (400) includes a network slice load controller (e.g., including processing/controlling circuitry) (410), a memory (420), a processor (e.g., including processing circuitry) (430), a communicator (e.g., including communication circuitry) (440), an ORAN Control Unit Control Plane (O-CU-CP) (450), an ORAN Control Unit User Plane (O-CU-UP) (460), and an ORAN Distribution Unit (O-DU) (470). In an embodiment, the base station (400) additionally includes the ML model (not shown). The network slice load controller (410) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The network slice load controller (410) receives the request message for the network slice load information from the core network device (100) of the wireless network. The network slice load controller (410) determines the network slice load based on a parameter. The parameter comprises time, a load of the base station (400), a base station identifier, User Equipment's (UEs) capability details, Quality of Service (QoS) or QoS Class Identifier (QCI) information, channel conditions, a Channel Quality Indicator (CQI) distribution of the UEs, climatic conditions, base station capabilities, day information, base station topology, load information of neighboring base stations, transmit power of the neighboring base stations, capabilities of the neighboring base stations, load information of the neighboring base stations. In an embodiment, the ML model receives the parameter. Further, the ML model predicts the network slice load based on the parameter and provides the predicted network slice load to the network slice load controller (410). The ML model provides a base station identifier and optimal slice management decision. The network slice load controller (410) sends the response message comprising the network slice load information to the core network device (100) for managing the network slice load.

The ML model implementation brings down complexity in determining the slice load as the ML model may include adders, multipliers and activation functions which, for sake of hardware, may be approximately implemented. The ML model can be used to approximate activation functions such as unit step function, sign function, linear function, piecewise linear function, logistic sigmoid function. hyperbolic tangent function, rectified linear unit function, rectified soft-plus function for reducing complexity in determining the slice load at the RAN. Even if the ML model have many nodes in a layer, these nodes may be executed in parallel. Hence the ML model trades time complexity for space in this way.

In an embodiment, the network slice load controller (410) receives the request message for the network slice load information from the near-RT RIC (300). The network slice load controller (410) sends the response message comprising the network slice load information to the near-RT RIC (300).

In an embodiment, the core network device (100) and the network slice load controller (410) communicates each other using the new E2 interface. In an embodiment, the base station (400) sends the response message periodically or on-demand.

In an embodiment, the request message is a Radio-access-network Intelligence Controller (RIC) subscription request, and the response message is a RIC indication.

The memory (420) stores instructions to be executed by the processor (430). The memory (420) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (420) may, in some examples, be considered a non-transitory storage medium. The term "non-transitory" may indicate that the storage medium is not embodied in a carrier wave or a propagated signal. However, the term "non-transitory" should not be interpreted that the memory (420) is non-movable. In some examples, the memory (420) can be configured to store larger amounts of information than its storage space. In certain examples, a non-transitory storage medium may store data that can, over time, change (e.g., in Random Access Memory (RAM) or cache). The memory (420) can be an internal storage unit or it can be an external storage unit of the base station (400), a cloud storage, or any other type of external storage.

The processor (430) is configured to execute instructions stored in the memory (420). The processor (430) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (430) may include multiple cores to execute the instructions. The communicator (440) is configured for communicating internally between hardware components in the base station (400). Further, the communicator (440) is configured to facilitate the communication between the base station (400) and other devices via one or more networks (e.g. Radio technology). The communicator (440) includes an electronic circuit specific to a standard that enables wired or wireless communication.

A function associated with ML model may be performed through the non-volatile/volatile memory (420), and the processor (430). The one or a plurality of processors (430) control the processing of the input data in accordance with a predefined operating rule or the ML model stored in the non-volatile/volatile memory (420). The predefined operating rule or the ML model is provided through training or learning. Being provided through learning may refer, for example, to, by applying a learning method to a plurality of learning data, the predefined operating rule or the ML model of a desired characteristic being made. The learning may be performed in the base station (400) itself in which the ML model according to an embodiment is performed, and/or may be implemented through a separate server/system. The ML model may include a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks. The learning method is a method for training a predetermined target device (for example, a robot) using a plurality of learning data to cause, allow, or control the target device to make a determination or prediction. Examples of the learning method include, but are not limited to, supervised learning, unsupervised learning, semi-supervised learning, or reinforcement learning.

Although FIG. 1B shows the hardware components of the base station (400) it is to be understood that various embodiments are not limited thereon. In various embodiments, the base station (400) may include less or a greater number of components. Further, the labels or names of the components are used only for illustrative purpose and does not limit the scope of the disclosure. One or more components can be combined together to perform same or substantially similar function for managing the network slice load.

Figure 2:
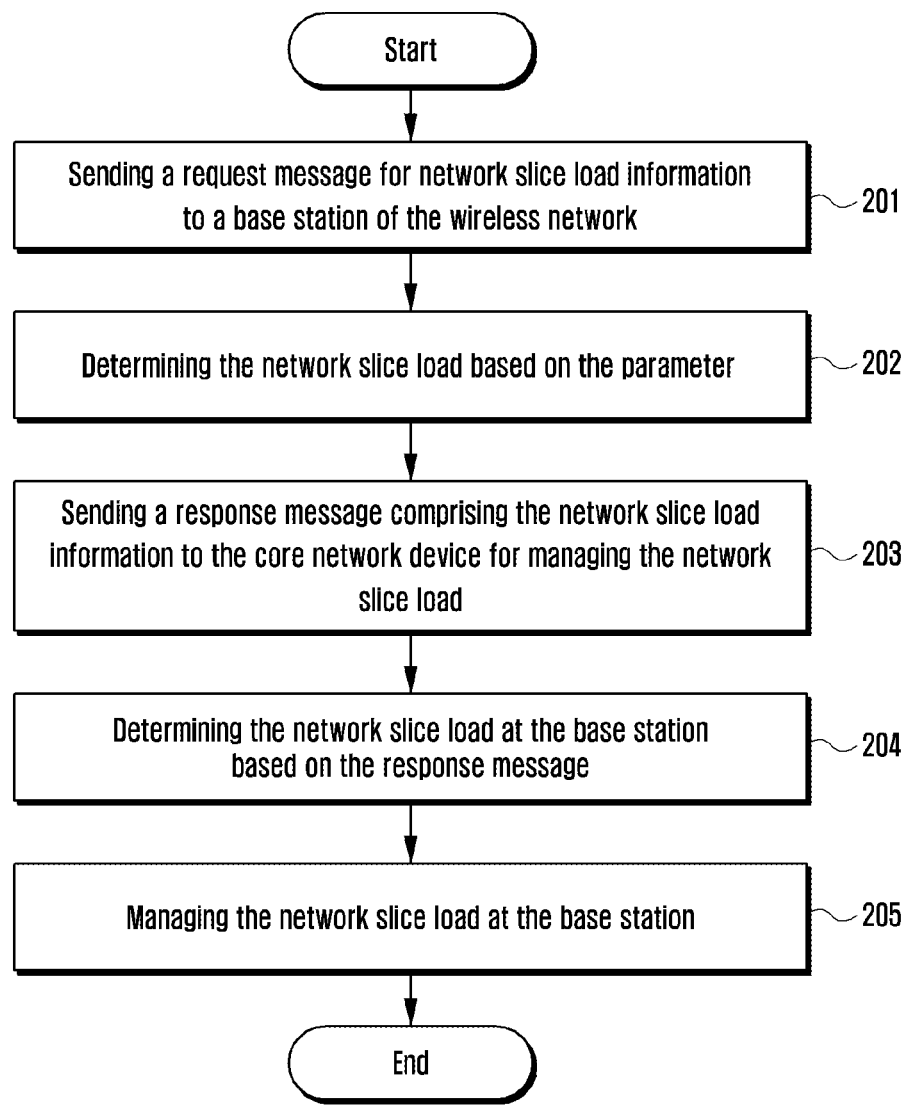
FIG. 2 is a flowchart illustrating an example method for managing the network slice load in the wireless network, according to various embodiments.

FIG. 2 is a flowchart illustrating an example method for managing the network slice load in the wireless network, according to various embodiments. In an embodiment, the method allows the network slice load controller (110) to perform operations 201, 204, 205 of the flowchart. In an embodiment, the method allows the network slice load controller (410) to perform operations 202, 203 of the flowchart. At operation 201, the method includes sending the request message for network slice load information to the base station (400) of the wireless network. At operation 202, the method includes determining the network slice load based on the parameter. At operation 203, the method includes sending the response message comprising the network slice load information to the core network device (100) for managing the network slice load. At operation 204, the method includes determining the network slice load at the base station (400) based on the response message. At operation 205, the method includes managing the network slice load at the base station (400).

In an embodiment, sending, by the core network device (100), the request message for the network slice load information to the base station (400) of the wireless network, comprises sending, by the core network device (100), the request message to the non-RT RIC (200) through the proprietary interface/message or the new O-RAN standard E1 Application protocol (E1AP) interface/message. Further, the method includes sending, by the non-RT RIC (200), a slice load monitoring request to the near-RT RIC (300). Further, the method includes sending by the near-RT RIC (300), a RIC subscription request to the base station (400) for the network slice load information.

In an embodiment, receiving, by the core network device (100), the response message comprising the network slice load information from the base station (400), comprises sending, by the base station (400), the network slice load information to the near-RT RIC (300), where the base station (400) predicts the network slice load by providing the parameter to the ML model. Further, the method includes sending, by the near-RT RIC (300), the slice load monitoring indication comprising the network slice load information to the non-RT RIC (200). Further, the method includes sending, by the non-RT RIC (200), the response message comprising the network slice load information to the core network device (100) through the proprietary interface/message or the new O-RAN standard E1AP interface/message by mapping a base station slice with a corresponding core network slice. Further, the method includes receiving, by the core network device (100), the response message from the non-RT RIC (200).

In an embodiment, sending, by the core network device (100), the request message for the network slice load information to the base station (400) of the wireless network, comprises sending, by the core network device (100), the request message to the near-RT RIC (300) through the new O-RAN standard E1AP interface/message. Further, the method includes sending, by the near-RT RIC (300), the RIC subscription request to the base station (400) for the network slice load information.

In an embodiment, receiving, by the core network device (100), the response message comprising the network slice load information from the base station (400), comprises sending, by the base station (400), the network slice load information to a near-RT RIC (300), where the base station (400) predicts the network slice load by providing the parameter to a ML model. Further, the method includes sending, by the near-RT RIC (300), the response message comprising the network slice load information to the core network device (100) through the new O-RAN standard E1AP interface/message. Further, the method includes receiving, by the core network device (100), the response message from the near-RT RIC (300). In an embodiment, the near-RT RIC (300) stores the network slice load information, upon receiving the network slice load information from the base station (400).

The various actions, acts, blocks, steps, or the like in the flowchart may be performed in the order presented, in a different order, or simultaneously. Further, in some embodiments, some of the actions, acts, blocks, steps, or the like may be omitted, added, modified, skipped, or the like without departing from the scope of the disclosure.

Figure 3:
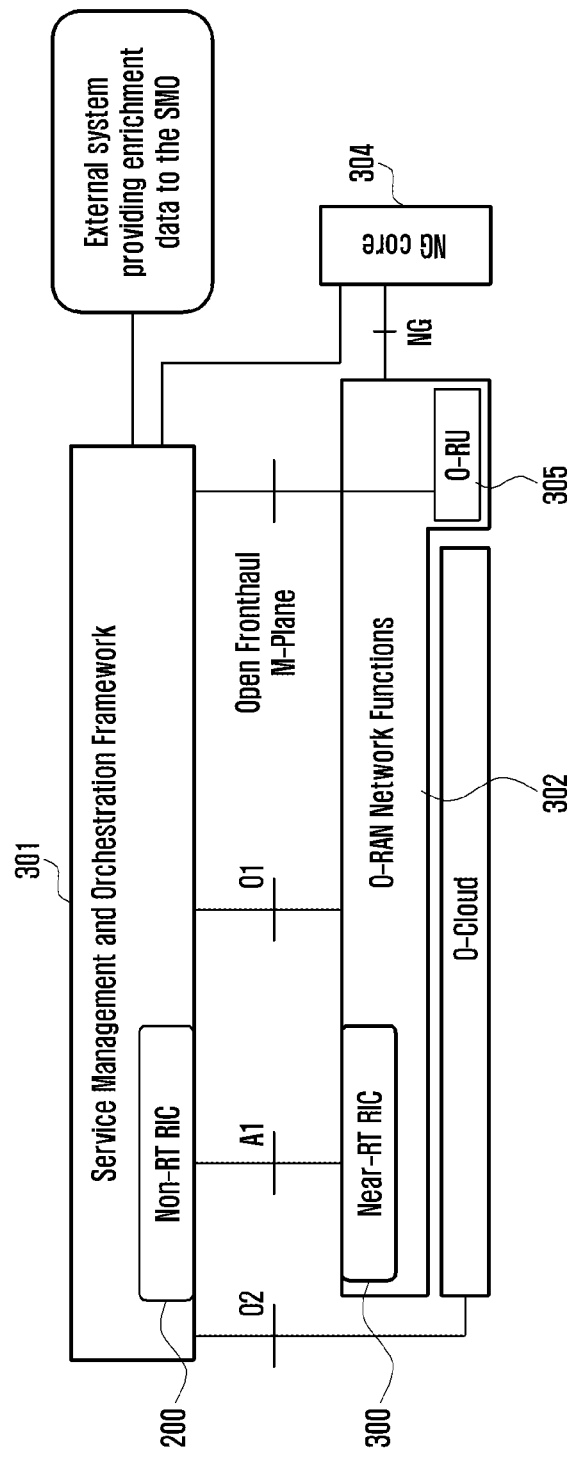
FIG. 3 is a diagram illustrating a NG core and an ORAN management and orchestration framework, according to various embodiments.

FIG. 3 is a diagram illustrating an example interface between a Next Generation (NG) core (304) (e.g., core network device) and an ORAN network functions (302), according to various embodiments. The ORAN network functions (302) includes the near-RT RIC (300) and O-RU (305). Interfaces between the NG core (304) and ORAN network functions (302) are provided for a call flow between the near-RT RIC (300) and the NG core (304) to slice a RAN slice, for a call flow to implement RAN slicing based on an instruction from the NG core (304), and for a communication between the RAN (400) and the NG core (304) regarding the load information, and also for the slice mapping between the RAN slice and its corresponding core slice.

Figure 4:
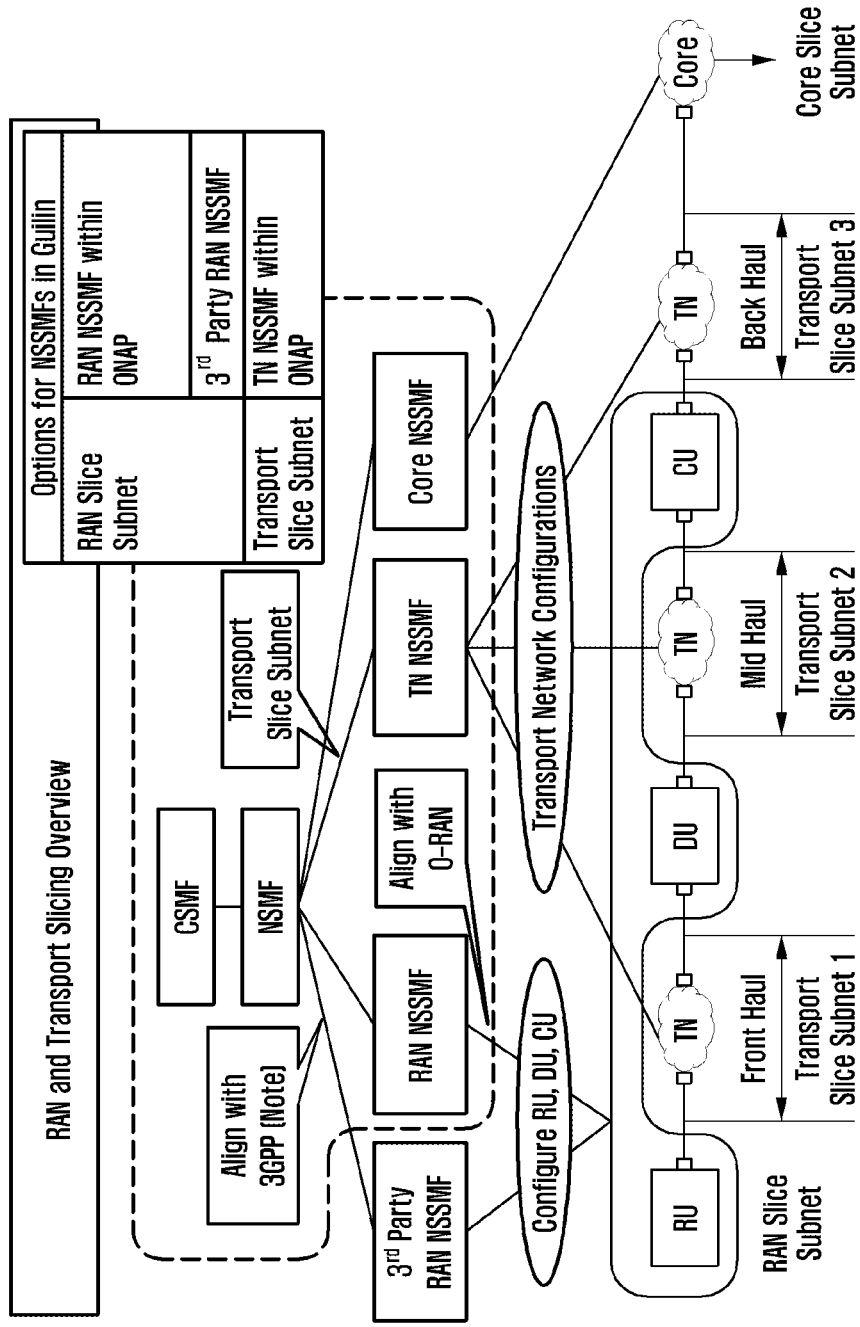
FIG. 4 is a diagram illustrating an overview of various network elements in a RAN and core network elements including transport slicing, according to various embodiments.

FIG. 4 is a diagram illustrating an overview of various network elements in RAN and core network elements including transport slicing, according to various embodiments. Network Slice Management Function (NSMF) has full visibility and control over the end-to-end slice and its performance. The RAN (or base stations—refer to FIG. 2) (400) and core Network Slice Subnet Management Function (NSSMF) monitors to gather the network slice statistics and pass the network slice statistics onto the NSMF, which can in turn decides the optimal network slice. Further, the NSMF then instructs the NSSMF to instantiate a new slice by passing Network Slice Subnet Instance (NSSI) (Scaling). The CN device (100) performs load balancing between the slices, e.g., reconfigure the bearer to a less loaded slice on effected gNodeB, throttle the slice data traffic of delay tolerance slice services (e.g. enhanced Mobile Broadband (eMBB)) to promote a low latency slice services (e.g. Ultra-Reliable And Low-Latency Communication (URLLC)).

Figure 5:
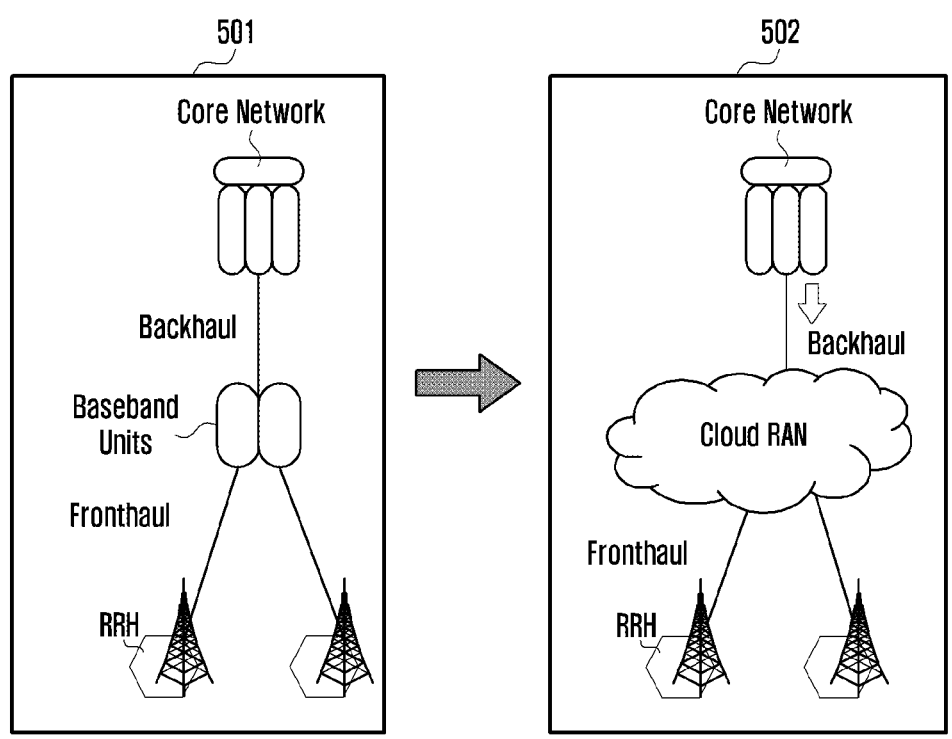
FIG. 5 is a diagram illustrating an example non-virtualized RAN and a cloud RAN architecture, according to various embodiments.

FIG. 5 is a diagram illustrating an example non-virtualized RAN and a cloud RAN architecture, according to various embodiments. 501 is a schematic diagram of a Centralized RAN (C-RAN) includes the CN connected to Remote Radio Head (RRH) via baseband units. 502 is a schematic diagram of the C-RAN with Network Functions Virtualization (NFV). CN functions are collocated with the cloud RAN. The ML model is located in the cloud RAN or baseband units. All the backend ML processing is done in the cloud RAN. Neural Networks (NNs) in the ML model learn weights of the NN using belief propagation method. After training the NN, the NN estimates the load of all slices and conveys the estimated load details of all slices to other base stations.

Figure 6:
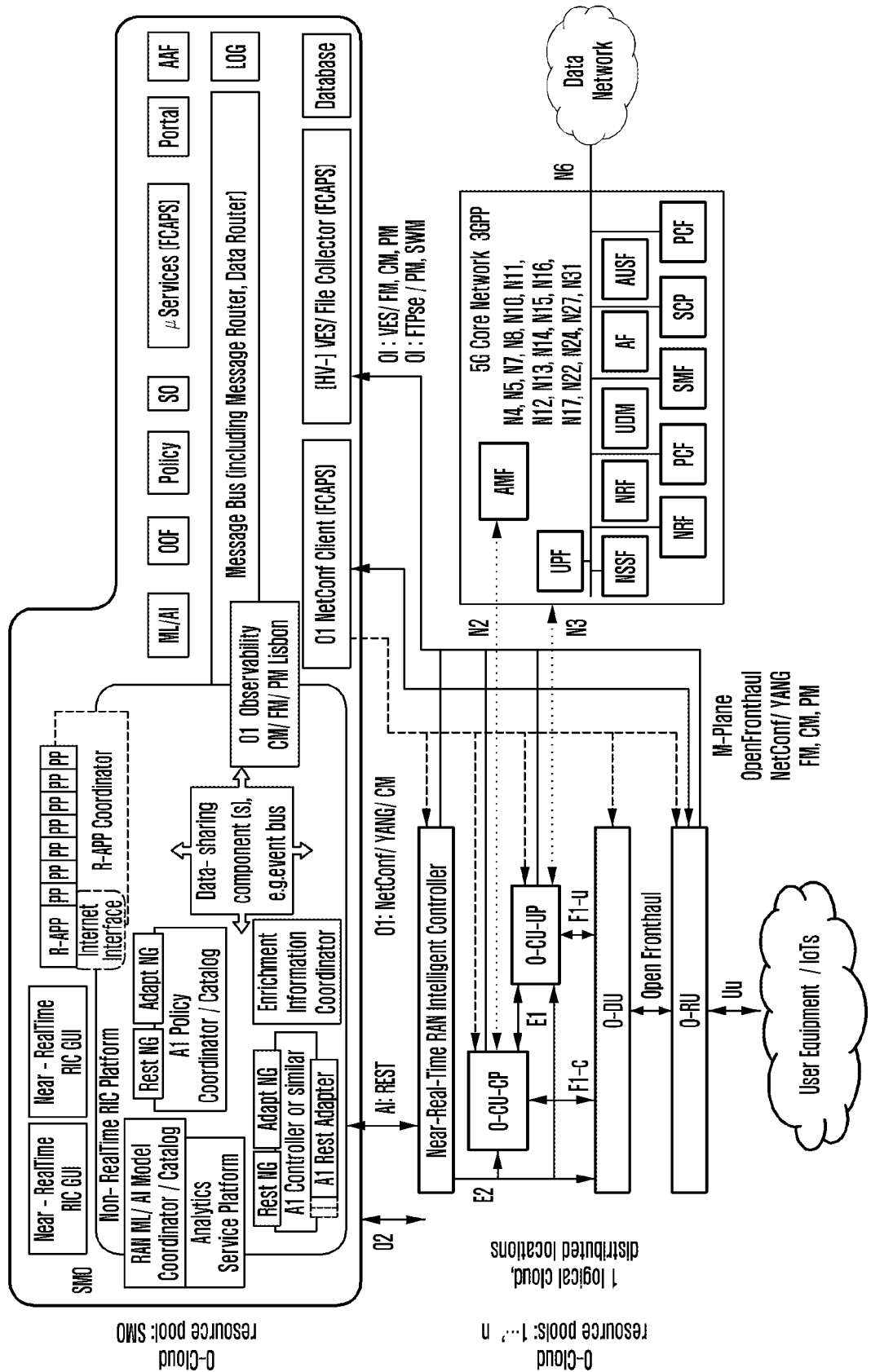
FIGS. 6 and 7 are diagrams illustrating an example method for an ORAN architecture which comprise of various network elements in a RAN and the core network elements including a Service Management & Orchestrator (SMO) at the RAN and the CN, according to various embodiments.
Figure 7:
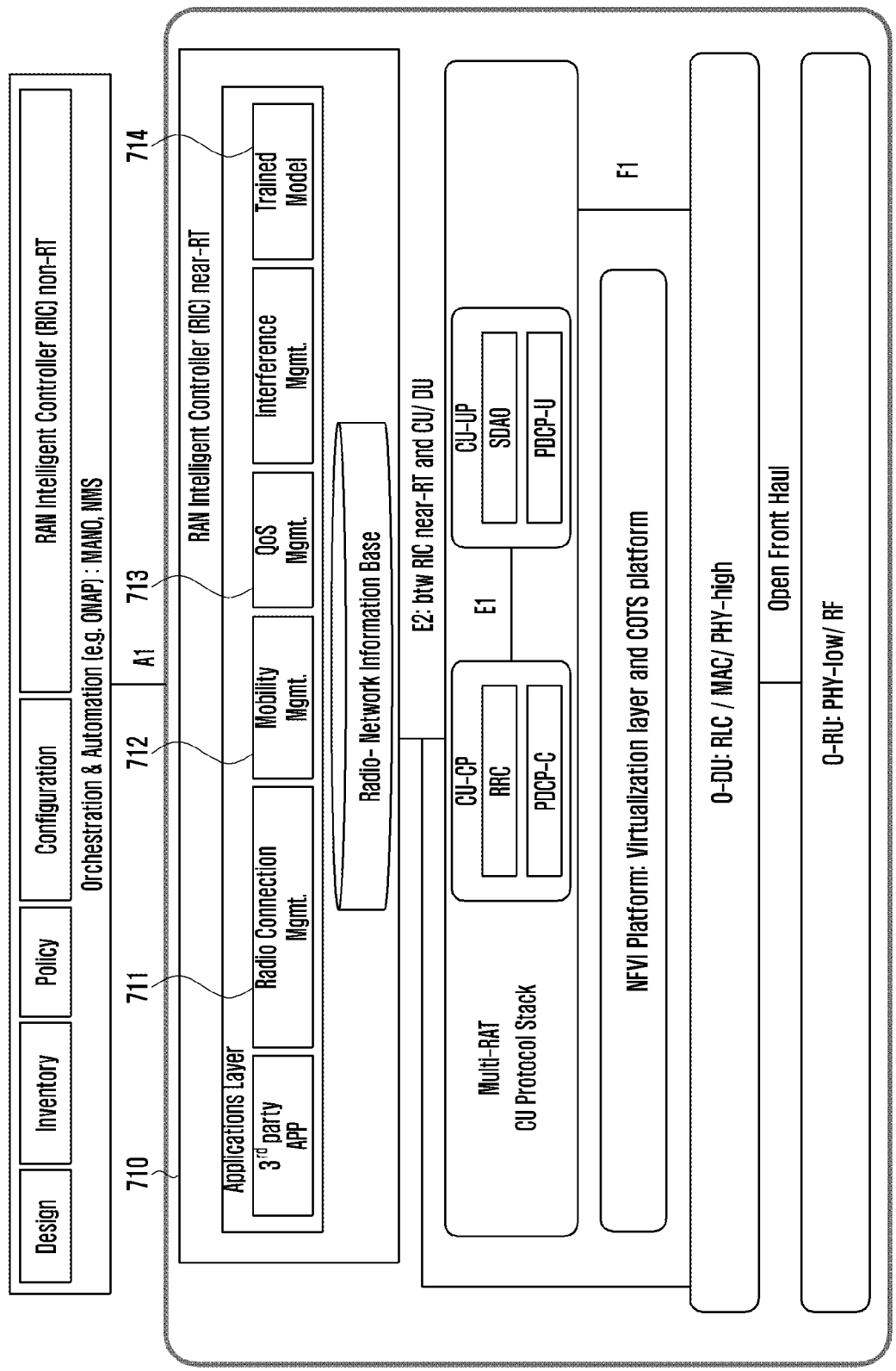

FIGS. 6 and 7 are diagrams illustrating an example method for an ORAN architecture which comprise of various network elements in the RAN and the core network elements including a Service Management & Orchestrator (SMO) at the RAN and the CN (100), according to various embodiments. With reference to FIG. 6, the cloud RAN system estimates the slice load using the ML model by providing the various parameters to the ML model. The ML model is located in the RIC near-real time. The NNs of the ML model learns the weights using belief propagation method. After training the NN, the NN estimates expected slice load of users. The RAN periodically/on-demand shares the slice load information with the core network cloud for the slice management.

FIG. 7 is a diagram illustrating an example method in a standard ORAN architecture, according to various embodiments. The ORAN includes a RAN Intelligent Controller (RIC) (710). The network slice load controller (410) uses the ML model embedded in the RIC (710) of the ORAN for estimating the network slice load, whereas the ML model is implemented in a trained model (714) of the RIC (710). The trained model (714) provides feedback of the ML model to a QoS management block (713), a mobility management block (712), and a radio connection management block (711) of the RIC (710) for improving overall performance of the ORAN.

Figure 8:
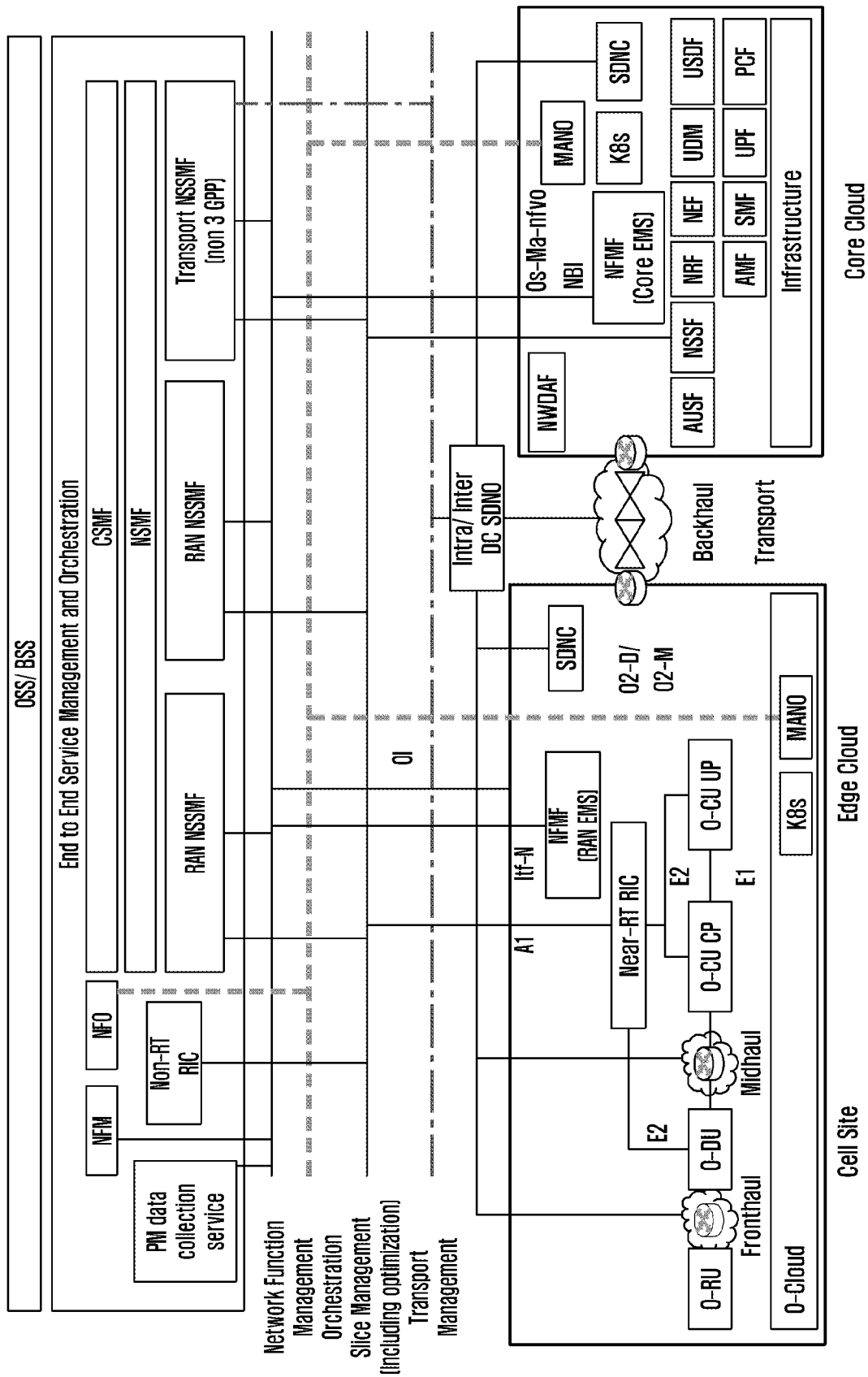
FIG. 8 is a diagram illustrating an example model of slice management and interface between a non-RT RIC and core cloud, according to various embodiments.

FIG. 8 is a diagram illustrating an example model of slice management and interface between the non-RT RIC (200) and core cloud, according to various embodiments. The slice management interface can be proprietary. The core cloud subscribe for the slice load information per gNB (O-RU, O-DU, O-CU-CP, O-CU-UP). The requested information is shared to the core cloud by the RIC. In the event of congestion the core cloud slice management can throttle the data throughput of slice un-effecting a high priority slice traffic, and streamline the slice allocation for congestion mitigation. The interface between the non-RT RIC (200) and the CN device (100) may be a new interface or a proprietary interface. The CN device (100) starts/stops the subscription for a periodic or on-demand delivery based of slice load information per DU/UP, Physical Resource Blocks (PRBs) usage, slice load information from RIC. The CN device (100) use the slice load information for optimizing the slice resource, slice management and throughput optimization per slice.

FIGS. 9, 10, 11 and 12 are signal flow diagrams illustrating example signaling in a system for managing the network slice load in the wireless network, according to various embodiments.

Figure 9:
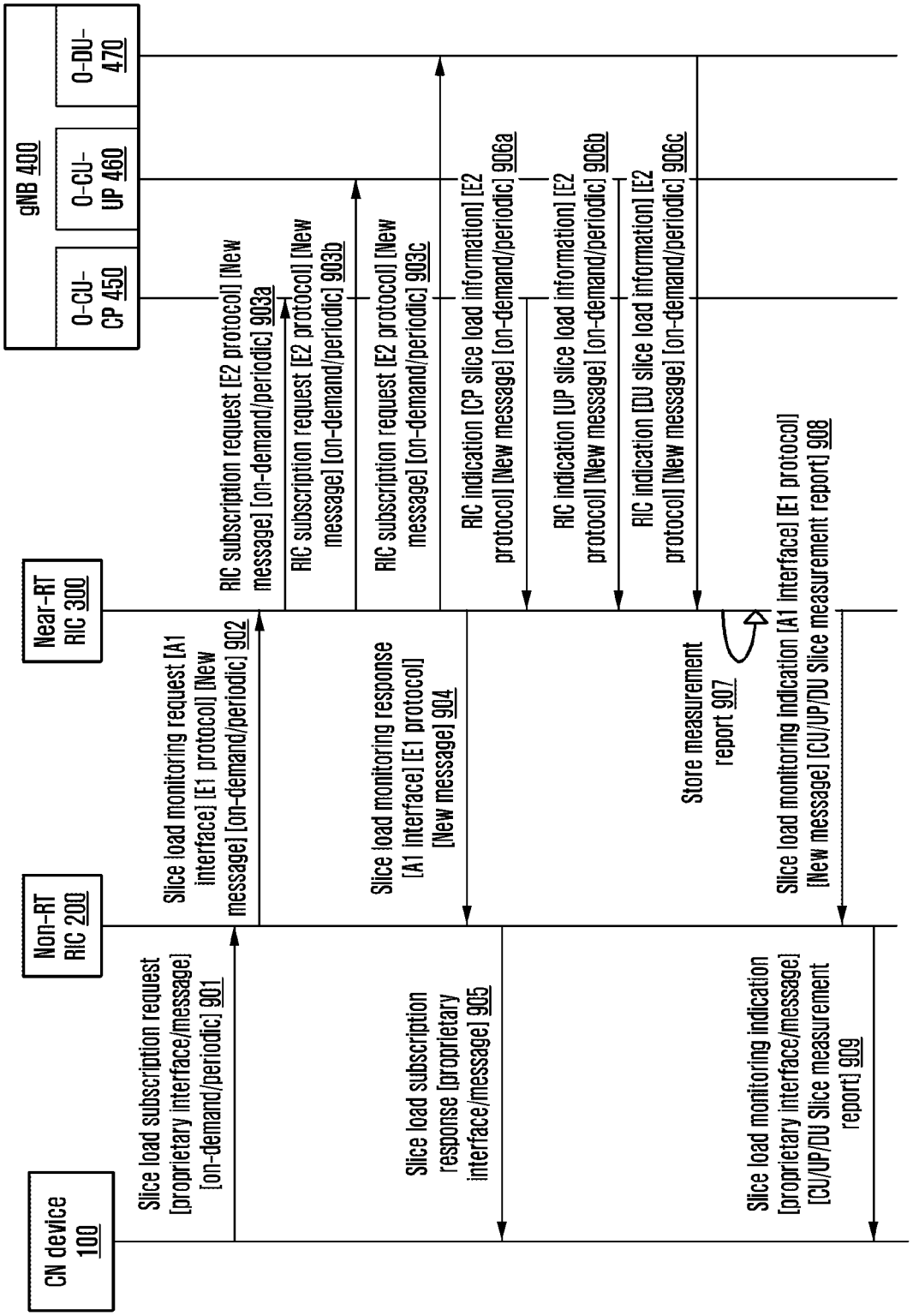
FIGS. 9, 10, 11 and 12 are signal flow diagrams illustrating example signaling in a system for managing the network slice load in the wireless network, according to various embodiments.

Referring to the signal flow diagram illustrated in FIG. 9, the system includes the CN device (100), the non-RT RIC (200), the near-RT RIC (300), and the gNB (400), where the gNB (400) includes E2 nodes (450, 460 and 470). At 901, the CN device (100) subscribes for the slice load information to the ORAN non-RT RIC (200) through the proprietary interface and message by sending the slice load subscription request. At 902, the non-RT RIC (200) requests the near-RT RIC (300) for monitoring the slice, PRB, and cell load by sending the slice load monitoring request. The interface between the non-RT RIC (200) and the near-RT RIC (300) is via standard A1 interface and protocol to use is E1. At 903a, 903b and 903c, the near-RT RIC (300) requests the E2 nodes (450-470) of the gNB (400) by sending the RIC subscription request to report the requested PM using the E2 interface. Based on the request, the O-CU-CP (450) requests the UE for the corresponding UE reports. The interface between the near-RT RIC (300) and the gNB nodes (450-470) is via standard E2 interface and protocol to use is E2AP/E2SM. At 904, the near-RT RIC (300) sends a slice load monitoring response to the non-RT RIC (200) upon sending the RIC subscription request. At 905, the non-RT RIC (200) sends a slice load subscription response to the CN device (100).

At 906, 906b and 906c, the E2 nodes (450-470) report the requested PM data (e.g., slice load information) to the near-RT RIC (300) based on the PM configuration by sending the RIC indication. At 907, the near-RT RIC (300) stores the slice load information. At 908, the near-RT RIC (300) provides a mediated KPI to the non-RT RIC (200) based on the request from the non-RT RIC (200) by sending the slice load monitoring indication. The non-RT RIC (200) on-demand/periodically reports the slice load information to the CN device (100) through the same or similar proprietary interface and message by sending the slice load monitoring indication. The CN device (100) uses the slice load information for optimizing the slice resource, slice management and throughput optimization per slice. Only the interface and communication protocol between the CN device (100) and non-RT RIC (200) is proprietary, rest all interfaces and communication protocols are standard ORAN interfaces. No direct path is present between the CN device (100) and the gNB nodes (450-470).

Information Elements (IE), range, IE type and reference and semantics description in the slice load monitoring request is given in table 1.

TABLE 1

| IE/Group Name Message Type | Range | IE type and reference | Semantics description |
|---|---|---|---|
| CN node1 Measurement ID | | INTEGER (1 ... 4095, ...) | Allocated by NG-CN node$_1$ |
| NG-RAN node2 Measurement ID | | INTEGER (1 ... 4095, ...) | Allocated by NG-RAN node$_2$ |
| Registration Request | | ENUMERATED(start, stop, add, ...) | Type of request for which the resource status is required. |
| Report Characteristics | | BITSTRING (SIZE(32)) | Each position in the bitmap indicates measurement object the NG-RAN node2 is requested to report. First Bit = PRB Periodic, Second Bit = TNL Capacity Ind Periodic, Third Bit = Composite Available Capacity Periodic, Fourth Bit = Number of Active UEs, Fifth Bit = RRC connections. Other bits shall be ignored by the NG-RAN node2. |
| >>SSB To Report List | 0 ... 1 | | SSB list to which the request applies. |
| >>>SSB To Report Item | 1 ... <maxnoofSSBAreas> | | |
| >>>>SSB-Index | | INTEGER (0 ..., 63 ...) | |
| >>Slice To Report List | 0 ... 1 | | S-NSSAI list to which the request applies. |
| >>>Slice To Report Item | 1 ... <maxnoofBPLMNs > | | |
| >>>>PLMN Identity | | | Broadcast PLMN |
| >>>>S-NSSAI List | 1 | | |
| >>>>>S-NSSAI Item | 1 ... <maxnoofSliceItems> | | |
| >>>>>>S-NSSAI | | S-NSSAI | |
| Reporting Amount | | ENUMERATED(Once, Infinity) | In case of Once, the report will be sent once (On Demand), else will follow the reporting periodicity |
| Reporting Periodicity | | ENUMERATED(500 ms, 1000 ms, 2000 ms, 5000 ms, 10000 ms, ...) | Periodicity that can be used for reporting of PRB Periodic, TNL Capacity Ind Periodic, Composite Available Capacity Periodic. Also used as the averaging window length for all measurement object if supported. |

IE, range, IE type and reference and semantics description in the slice load monitoring response is given in table 2.

TABLE 2

| IE/Group Name Message Type | Range | IE type and reference | Semantics description |
|---|---|---|---|
| NG-RAN node1 Measurement ID | | INTEGER (1 ... 4095, ...) | Allocated by NG-RAN node1 |
| CN node2 Measurement ID | | INTEGER (1 ... 4095, ...) | Allocated by NG-CN node |
| Criticality Diagnostics | | | |

IE, range, IE type and reference and semantics description in slice load monitoring indication is given in table 3.

TABLE 3

| IE/Group Name Message Type | Range | IE type and reference | Semantics description |
|---|---|---|---|
| NG-RAN node1 Measurement ID | | INTEGER (1 ... 4095, ...) | Allocated by NG-RAN node1 |
| CN node2 Measurement ID | | INTEGER (1 ... 4095, ...) | Allocated by NG-CN node |
| Cell Measurement Result | 1 | | |
| >Cell Measurement Result Item | 1 ... <maxnoofCellsinNG-RANnode> | | |
| >>Cell ID | | | Global NG-RAN Cell Identity |
| >>Radio Resource Status | | | |
| >>TNL Capacity Indicator | | | |
| >>Composite Available Capacity Group | | | |
| >>Slice Available Capacity | | | |
| >>Number of Active UEs | | | |
| >> RRC Connections | | | |

Figure 10:
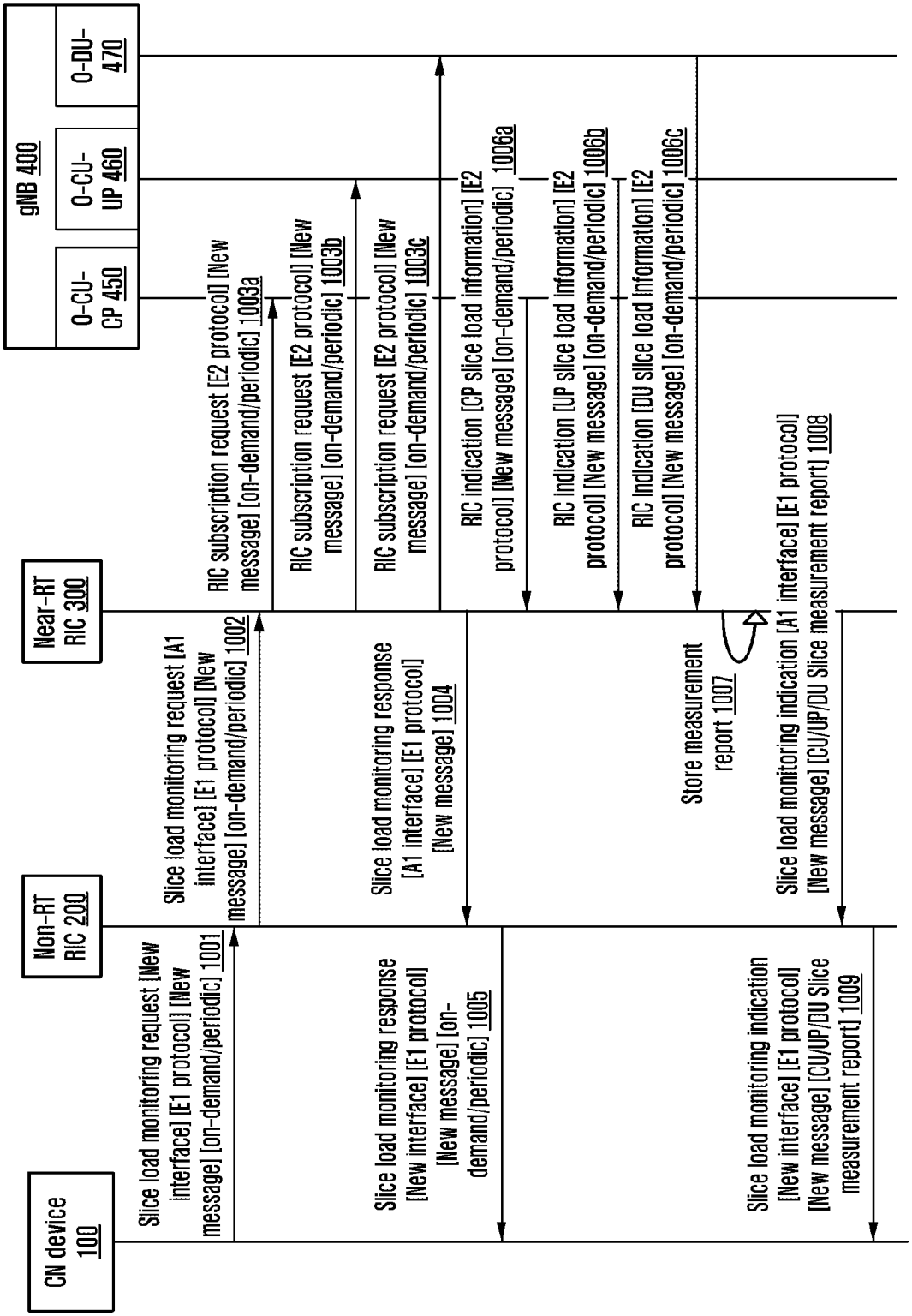

Referring to the signal flow diagram illustrated in FIG. 10, the system includes the CN device (100), the non-RT RIC (200), the near-RT RIC (300), and the gNB (400), where the gNB (400) includes E2 nodes (450, 460 and 470). At 1001, the CN device (100) subscribes to the non-RT RIC (200) by sending the slice load monitoring request via the new interface (e.g., new ORAN standard E1AP interface), new E1AP request message and using existing E1 protocol for receiving the slice load information on-demand or periodically. At 1002, the non-RT RIC (200) requests the near-RT RIC (300) for monitoring for the slice, the PRB, the cell load via the standard A1 interface and E1 protocol by sending the slice load monitoring request. At 1003a, 1003b and 1003c, the near-RT RIC (300) requests the E2 nodes (450-470) via the standard E2 interface and E2AP/E2SM protocol to report the requested PM using the E2 interface by sending the RIC subscription request. Further, the O-CU-CP (450) requests the UE for the corresponding UE reports based on the RIC subscription request. At 1004, the near-RT RIC (300) sends the slice load monitoring response to the non-RT RIC (200) upon sending the RIC subscription request. At 1005, the non-RT RIC (200) sends the slice load monitoring response to the CN device (100).

At 1006a, 1006b and 1006c, the E2 nodes (450-470) report the requested PM data to the near-RT RIC (300) based on the PM configuration by sending the RIC indication. At 1007, the near-RT RIC (300) stores the slice load information. At 1008, the near-RT RIC (300) provides the mediated KPI to the non-RT RIC (200) based on the request from the non-RT RIC (200) by sending the slice load monitoring indication. At 1009, the non-RT RIC (200) provides the slice load information to the CN device (100) periodically or on-demand via the new ORAN standard E1AP interface and the new E1AP response message by sending the slice load monitoring indication. The CN device (100) uses the slice load information for optimizing the slice resource, slice management and throughput optimization per slice. Only the interface between the CN device (100) and non-RT RIC (200) is newly added (the communication protocol will use E1AP), rest all interfaces and communication protocols are standard ORAN interface.

Figure 11:
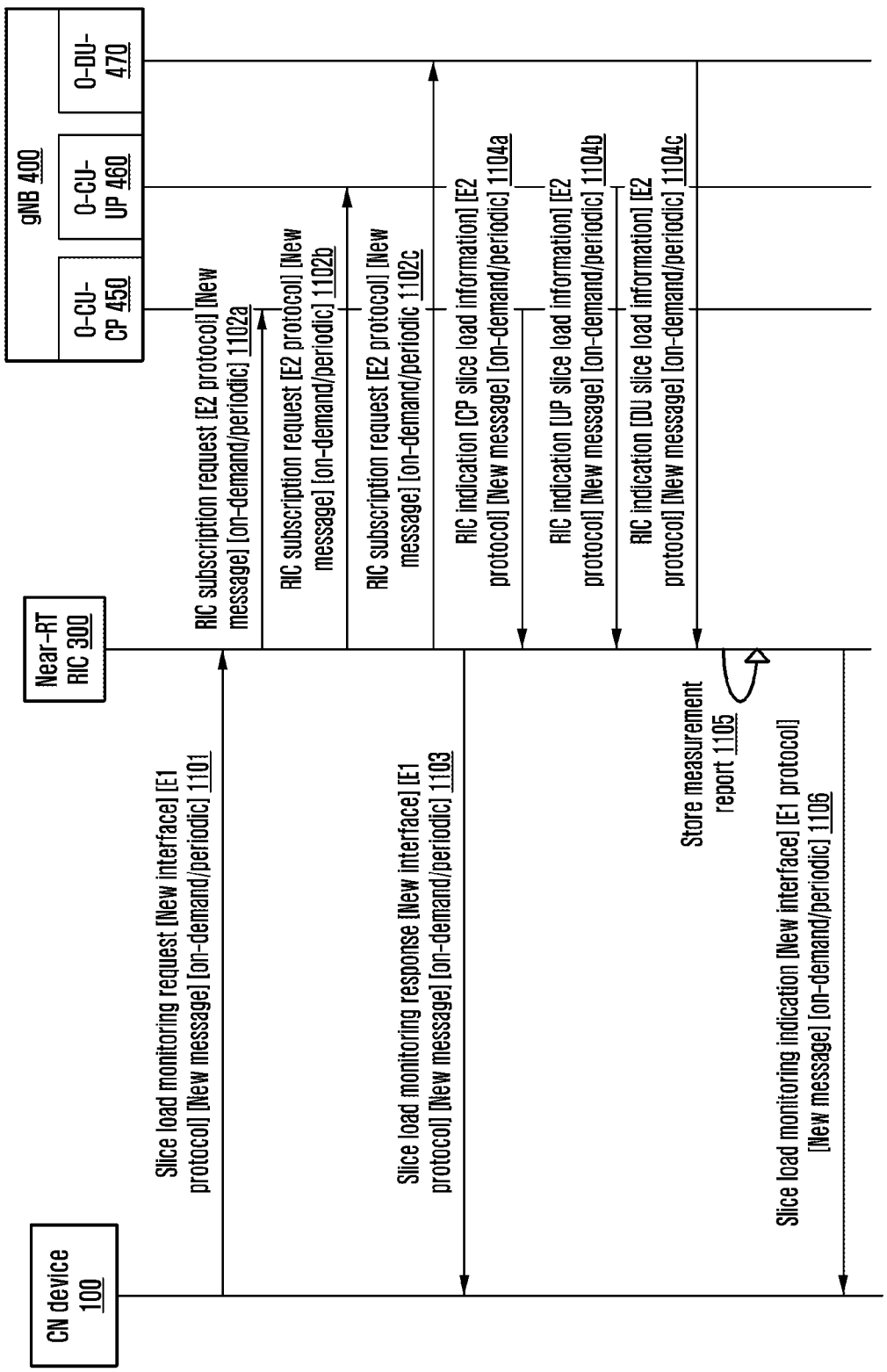

Referring to the signal flow diagram illustrated in FIG. 11, the system includes the CN device (100), the near-RT RIC (300), and the gNB (400), where the gNB (400) includes E2 nodes (450, 460 and 470). The CN device (100) subscribes for the slice load information to the near-RT RIC (300) through the new ORAN Standard E1AP interface and new E1AP request message. The near-RT RIC (300) on-demand/ periodically reports the slice load information to the CN device (100) through the E1AP interface and the new E1AP response message. At 1101, the CN device (100) subscribes for reporting on-demand or periodic the slice load from the near-RT RIC (300) through the new interface and existing E1 protocol. At 1102a, 1102b and 1102c, the near-RT RIC (300) requests to the E2 nodes (450-470) for reporting the requested PM using the E2 interface by sending the RIC subscription request. The O-CU-CP (450) requests the UE for the corresponding UE reports based on the request.

The interface between the near-RT RIC (300) and the gNB nodes (450-470) is via standard E2 interface and the E2AP/E2SM protocol. At 1103, the near-RT RIC (300) sends the slice load monitoring response to the CN device (100) upon sending the RIC subscription request. At 1104a, 1104b and 1104c, the E2 nodes (450-470) report the requested PM data to the near-RT RIC (300) based on the based on the PM configuration. At 1105, the near-RT RIC (300) stores the slice load information. At 1106, the near-RT RIC (300) provides the mediated KPI to the CN device (100) periodically or on-demand. The CN device (100) uses this information for optimizing the slice resource, slice management and throughput optimization per slice. Only the interface between the CN device (100) and near-RT RIC (300) is newly added, rest all interfaces and communication protocols are standard ORAN interface.

Figure 12:
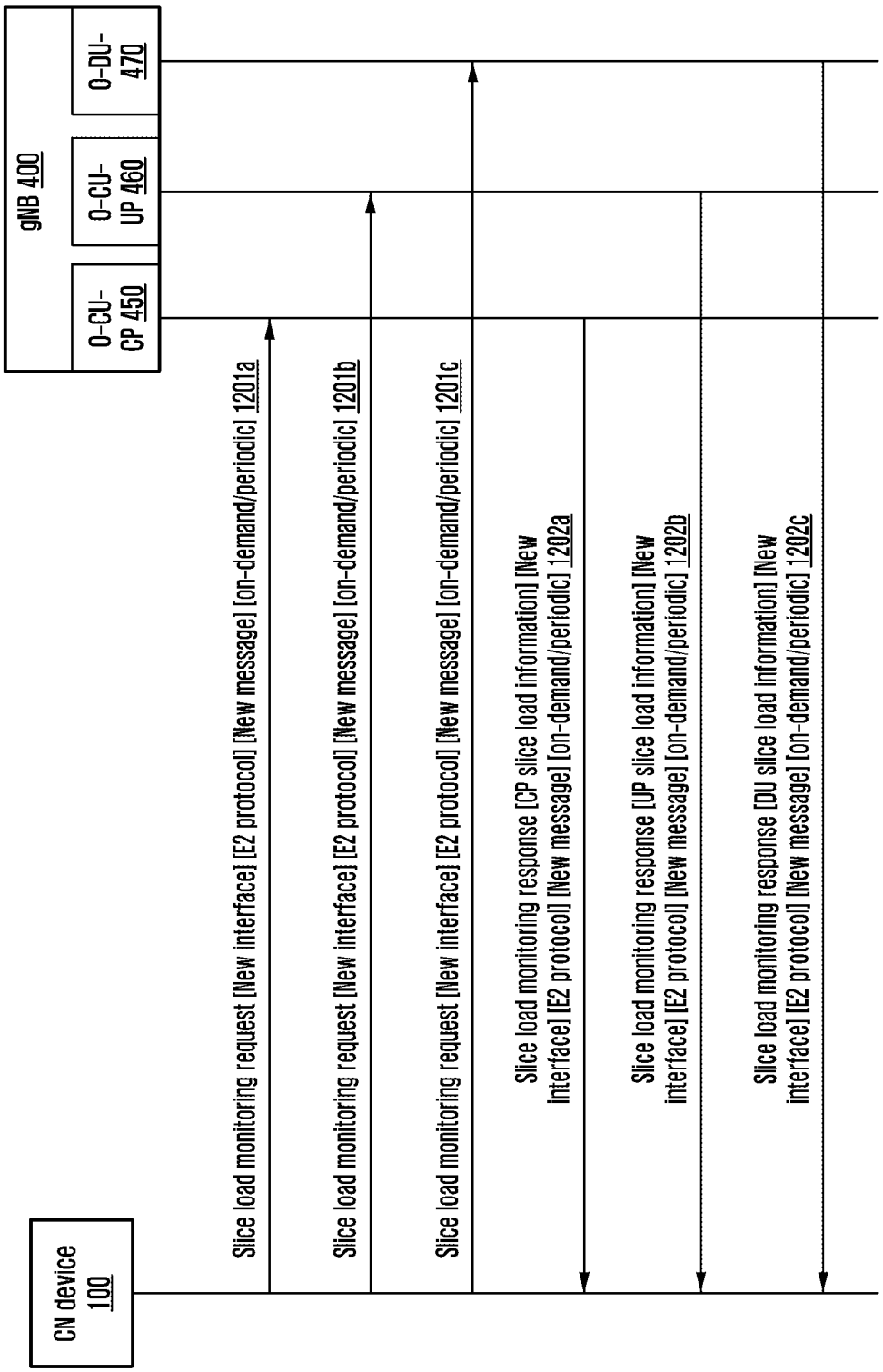

Referring to the signal flow diagram illustrated in FIG. 12, the system includes the CN device (100) and the gNB (400), where the gNB (400) includes E2 nodes (450-470). The CN device (100) subscribes for the slice load information to the gNodeB nodes (450-470) directly through the ORAN standard E2AP interface and the new E2AP request message. The E2 nodes (450-470) on-demand/periodically reports the load information through the E2AP interface and the new E2AP response message. The CN device (100) gets the slice load reports from the gNodeB nodes (450-470) through the new interface and the existing E2 protocol.

At 1201a, 1201b and 1201c, the CN device (100) subscribes for on-demand or periodic load information to the gNodeB nodes (450-470) via the new proprietary interface and existing E2 protocol. The CN device (100) requests to the E2 nodes (450-470) to report the requested Performance Management (PM) using the E2 interface. The O-CU-CP (450) requests the UE for the corresponding UE reports based on the request. The interface between the CN device (100) and the gNodeB nodes (450-470) is via new E2 interface and the E2AP/E2SM protocol. At 1202a, 1202b and 1202c, the E2 nodes (450-470) report the requested Performance Management (PM) data to the CN device (100) periodically or on-demand based on the PM configuration. The CN device (100) uses this information for optimizing the slice resources, the slice management and the throughput optimization per slice.

The method allows the system to control on slice resource allocation, traffic to mitigate the access node congestion. Once the ML model is trained, then latency will be brought down by balancing speed and accuracy. In any case since the base station (400) knows which CQI to ask for, the base station (400) can function efficiently also. Because of lesser latency and there will be a significant reduction of resource usage, improved battery efficiency and better performance, which improves a use experience.

The embodiments disclosed herein can be implemented using at least one hardware device and performing network management functions to control the elements.

While the disclosure is illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for managing a network slice load in a wireless network, comprising:
    sending, by a core network device of the wireless network, a request message for network slice load information to a base station of the wireless network;
    receiving, by the core network device, a response message comprising the network slice load information from the base station;
    determining, by the core network device, the network slice load at the base station based on the response message; and
    managing, by the core network device, the network slice load at the base station, and
    wherein sending the request message to the base station comprises:
        sending, by the core network device, a first request for the network slice load information to a Non-Real Time Radio-access-network Intelligence Controller (non-RT RIC) through a proprietary interface/message or a new Open Radio Access Network (O-RAN) standard E1 Application protocol (E1AP) interface/message;
        sending, by the non-RT RIC, a second request for a slice load monitoring to a Near Real Time Radio-access-network Intelligence Controller (near-RT RIC); and
        sending by the near-RT RIC, a third request for a Radio-access-network Intelligence Controller (RIC) subscription to the base station for the network slice load information.

2. The method as claimed in claim 1, wherein receiving, by the core network device, the response message comprising the network slice load information from the base station, comprises:
    sending, by the base station, the network slice load information to the near-RT RIC, wherein the base station predicts the network slice load by providing at least one parameter to a Machine Learning (ML) model;
    sending, by the near-RT RIC, a slice load monitoring indication comprising the network slice load information to the non-RT RIC;
    sending, by the non-RT RIC, the response message comprising the network slice load information to the core network device through the proprietary interface/message or the new O-RAN standard E1AP interface/message by mapping a base station slice with a corresponding core network slice; and
    receiving, by the core network device, the response message from the non-RT RIC.

3. The method as claimed in claim 2, wherein the method further comprises:
    storing, by near-RT RIC, the network slice load information, upon receiving the network slice load information from the base station.

4. The method as claimed in claim 1, wherein receiving, by the core network device, the response message comprising the network slice load information from the base station, comprises:
    sending, by the base station, the network slice load information to the near-RT RIC, wherein the base station predicts the network slice load by providing at least one parameter to a ML model;
    sending, by the near-RT RIC, the response message comprising the network slice load information to the core network device through the new O-RAN standard E1AP interface/message; and
    receiving, by the core network device, the response message from the near-RT RIC.

5. The method as claimed in claim 1, wherein the request message comprises a slice load monitoring request, and the response message comprises a slice load monitoring indication or a slice load monitoring response.

6. The method as claimed in claim 1, wherein the core network device and the base station communicate with each other using a new E2 interface.

7. The method as claimed in claim 1, wherein managing, by the core network device, the network slice load at the base station, comprises:
    performing, by the core network device, at least one of:
    load balancing between slice resources,
    scaling in/out the slice resources,
    spawning new slices to match QoS requirement, and
    throttling a slice data traffic of delay tolerance slice services to promote low latency slice services.

8. A method for managing a network slice load in a wireless network, comprises:
  receiving, by a base station of the wireless network, a request message for network slice load information from a core network device of the wireless network;
  determining, by the base station, the network slice load based on at least one parameter; and
  sending, by the base station, a response message comprising the network slice load information to the core network device for managing the network slice load, and
  wherein receiving, by the base station, the request message for the network slice load information from the core network device of the wireless network, comprises:
  sending, by the core network device, a first request for a slice load monitoring to a Non-Real Time Radio-access-network Intelligence Controller (non-RT RIC) through a proprietary interface/message or a new Open Radio Access Network (O-RAN) standard E1 Application protocol (E1AP) interface/message;
  sending, by the non-RT RIC, a second request for a slice load monitoring to a Near Real Time Radio-access-network Intelligence Controller (near-RT RIC);
  sending by the near-RT RIC, the request message to the base station for the network slice load information; and
  receiving, by the base station, the request message for the network slice load information from the near-RT RIC.

9. The method as claimed in claim 8, wherein determining, by the base station, the network slice load based on at least one parameter, comprises:
  receiving, by a Machine Learning (ML) model of the base station, the at least one parameter comprises at least one of time, a load of the base station, a base station identifier, User Equipment's (UEs) capability details, Quality of Service (QOS) or QoS Class Identifier (QCI) information, channel conditions, a Channel Quality Indicator (CQI) distribution of the UEs, climatic conditions, base station capabilities, day information, base station topology, load information of neighboring base stations, transmit power of the neighboring base stations, capabilities of the neighboring base stations, load information of the neighboring base stations; and
  predicting, by the ML model, the network slice load based on the at least one parameter.

10. The method as claimed in claim 8, wherein sending, by the base station, the response message comprising the network slice load information to the core network device, comprises:
  sending, by the base station, the response message comprising the network slice load information to the near-RT RIC;
  sending, by the near-RT RIC, a slice load monitoring indication comprising the network slice load information to the non-RT RIC; and
  sending, by the non-RT RIC, a slice load monitoring indication comprising the network slice load information to the core network device through a proprietary interface/message or a new O-RAN standard E1AP interface/message by mapping a base station slice with a corresponding core network slice.

11. The method as claimed in claim 8, wherein sending, by the base station, the response message comprising the network slice load information to the core network device, comprises:
  sending, by the base station, the response message comprising the network slice load information to the near-RT RIC;
  sending, by the near-RT RIC, the slice load monitoring indication comprising the network slice load information to the core network device through the new O-RAN standard E1AP interface/message; and
  receiving, by the core network device, the slice load monitoring indication from the near-RT RIC.

12. The method as claimed in claim 11, wherein the method further comprises:
  storing, by near-RT RIC, the network slice load information, upon receiving the network slice load information from the base station.

13. The method as claimed in claim 8, wherein the request message comprises a slice load monitoring request or a Radio-access-network Intelligence Controller (RIC) subscription request, and the response message comprises a RIC indication or a slice load monitoring response.

14. The method as claimed in claim 8, wherein the core network device and the base station communicate with each other using a new E2 interface.

15. The method as claimed in claim 8, wherein the base station sends the response message periodically or on-demand.

16. A core network device configured to manage a network slice load in a wireless network, comprises:
  a memory;
  a processor comprising processor circuitry; and
  a network slice load controller, coupled to the memory and the processor, configured to:
  send a request message for network slice load information to a base station of the wireless network,
  receive a response message comprising the network slice load information from the base station,
  determine the network slice load at the base station based on the response message, and
  manage the network slice load at the base station, and
  wherein the processor is further configured to send a first request for the network slice load information to a Non-Real Time Radio-access-network Intelligence Controller (non-RT RIC) through a proprietary interface/message or a new Open Radio Access Network (O-RAN) standard E1 Application protocol (E1AP) interface/message;
  wherein the non-RT RIC is configured to send a second request for a slice load monitoring to a Near Real Time Radio-access-network Intelligence Controller (near-RT RIC); and
  wherein the near-RT RIC is configured to send a third request for a Radio-access-network Intelligence Controller (RIC) subscription to the base station for the network slice load information.

* * * * *